US006553083B1

(12) United States Patent
Kawai

(10) Patent No.: US 6,553,083 B1
(45) Date of Patent: Apr. 22, 2003

(54) FREQUENCY CONTROL AND ORTHOGONAL DETECTION CIRCUIT AND FSK RECEIVER

(75) Inventor: Hisashi Kawai, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/258,306

(22) Filed: Feb. 26, 1999

(30) Foreign Application Priority Data

Feb. 27, 1998 (JP) ............................................ 10-046714
Jan. 20, 1999 (JP) ............................................ 11-011971

(51) Int. Cl.$^7$ ................................................ H04L 27/06
(52) U.S. Cl. ...................... 375/344; 375/322; 375/335; 375/334
(58) Field of Search ................................ 375/335, 334, 375/362, 340, 344, 371, 322, 324

(56) References Cited

U.S. PATENT DOCUMENTS 4,669,094 A * 5/1987 Van Rumpt .................. 375/334
5,469,112 A * 11/1995 Lee .............................. 375/340
5,602,835 A * 2/1997 Seki et al. ..................... 375/324

* cited by examiner

Primary Examiner—Chi Pham
Assistant Examiner—Demetria Williams
(74) Attorney, Agent, or Firm—Jacobson Holman PLLC

(57) ABSTRACT

The present invention is a frequency control and orthogonal detection circuit and a FSK receiver capable of reducing a circuit size and control of VCO appropriately. The orthogonal detection circuit and the FSK receiver of the present invention include a delay circuit, a decoder for decoding the direction of rotation, and a first integral electric discharging circuit to detect the direction of rotation of the signal point of a signal received. There is also a second delay circuit, an XOR circuit, an adder, and a second integral electric discharging circuit to detect a rotation of the signal point of a signal received. The decision circuit decides a symbol on the basis of them. The AFC circuit controls the frequency of a signal outputted by the VCO in comparison with an ideal signal outputted by the standardizing circuit.

10 Claims, 5 Drawing Sheets

FREQUENCY CONTROL AND ORTHOGONAL DETECTION CIRCUIT AND FSK RECEIVER

BACKGROUND OF THE INVENTION

1. Field of the Invention

The present invention relates to a method for frequency control and orthogonal detection circuit and FSK (Frequency Shift Keying) receiver used for a digital radio receiver etc., particularly relates to a method for frequency control and orthogonal detection circuits and FSK receiver capable of reduction of a circuit size and improving precision of frequency control.

2. Description of the Related Art

Conventional orthogonal detection circuit is illustrated with reference to FIG. 4. The FIG. 4 is a block diagram of a conventional orthogonal detection circuit.

A conventional orthogonal detection circuit, as shown in FIG. 4, comprises a VCO (voltage control oscillator) 1 outputting an oscillating frequency, a phase shifter 2 shifting a phase of a signal 90°, the first mixing circuit 3a and the second mixing circuit 3b multiplying two signals, the first LPF (low path filter) 4a and the second LPF 4b removing a high frequency component, the first comparator 5a and the second comparator 5b outputting a digital signal over or not over a certain threshold value, the first moving average circuit 6a and the second moving average circuit 6b average an input signal, a phase angle detector 7 computing a phase angle, a differential analyzer 8 differentiating a phase angle signal, an integral electric discharge circuit 9 integrating an inputted signal for 1 symbol time, a phase detection circuit 10 detecting a changing point of a phase in an input signal, a synchronizing circuit 11 outputting a synchronized signal for an inputted signal showing detected changing point of a phase, a decision circuit 12 deciding the state of an integral signal, a standardizing circuit 13 outputting an appropriate integrated result based on the decision signal, a differential circuit 14 computing a difference between the output of the integral electric discharge circuit 9 and the output of the standardizing circuit 13, and an AFC (automatic frequency control) circuit 15 controlling local oscillation frequency of the VCO 1.

Herewith, functions of each part of a conventional orthogonal detection circuit will be specifically described with reference to the FIGS. 4 and 5. FIG. 5 is a drawing of a timing chart showing action of the conventional orthogonal detection circuit.

The VCO 1 is an oscillator working as a local oscillator of which oscillation frequency is controlled by the AFC circuit 15 that will be mentioned later.

The phase shifter 2 shifts the phase of a signal inputted from the VCO 1 90°.

The first mixing circuit 3a multiplies a received signal by a signal (oscillation frequency) inputted from the VCO 1 to output to the first LPF 4a. The signal outputted from the first mixing circuit 3a is one of the received signals and has the same phase component (hereafter, "I phase component") as that of the signal outputted by the VCO 1.

The second mixing circuit 3b multiplying a received signal to a shifted signal inputted from the phase shifter 2 to output to the second LPF 4b. A signal outputted by the second mixing circuit 3b is one of the received signal and a component orthogonal (hereafter, "Q phase component") to the signal outputted by the VCO 1.

The first LPF 4a removes a high frequency component of the signal of I phase component inputted from the first mixing circuit 3a to make, for example, a signal as shown in FIG. 5(a), and output to the first comparator 5a.

The second LPF 4b removes a high frequency component of the signal of Q phase component inputted from the second mixing circuit 3b to make, for example, a signal as shown in FIG. 5(b), and output to the second comparator 5b.

The first comparator 5a detects a signal inputted from the first LPF 4a over a certain threshold value; if the signal is over the threshold value, outputs 1 bit digital signal representing "1", and if not over, outputs 1 bit digital signal representing "0".

This means, for example, when a signal of the FIG. 5(a) is inputted to the first comparator 5a, the first comparator 5a outputs a signal as shown in the FIG. 5(c).

The second comparator 5b, as same as the first comparator 5a, detects a signal inputted from the second LPF 4b over a certain threshold value; if the signal is over the threshold value, outputs 1 bit digital signal representing "1" and if not over, outputs 1 bit digital signal representing "0".

This means, for example, when a signal of the FIG. 5(b) is inputted to the second comparator 5b, the second comparator 5b outputs a signal as shown in the FIG. 5(d).

Hereafter, a signal outputted by the first comparator 5a is named "quantized signal I" and a signal outputted by the second comparator 5b is named "quantized signal Q".

The first moving average circuit 6a averages a quantized signal I inputted from the first comparator 5a to generate a signal with a gradually changed wave form. Specifically, for example, when a signal shown in the FIG. 5(c) is inputted, the first moving average circuit 6a outputs a signal with a wave form shown in the FIG. 5(e).

The second moving average circuit 6b averages a quantized signal Q inputted from the second comparator 5b to generate a signal with a gradually changed wave form. Specifically, for example, when a signal shown in the FIG. 5(d) is inputted, the second moving average circuit 6b outputs a signal with a wave form shown in the FIG. 5(f).

The phase angle detector 7 divides a signal inputted from the second moving average circuit 6b with a signal inputted from the first moving average circuit 6a, and compute arctangent of the quotient yielded by the division to output to the differential analyzer 8.

If a signal inputted from the first moving average circuit 6a is assumed "I" and a signal inputted from the second moving average circuit 6b is assumed "Q", a signal of the phase angle (a phase angle signal) θ outputted by the phase angle detector 7 is expressed by the following formula (1).

$$\theta = \tan^{-1}(Q/I) \qquad \text{[Formula 1]}$$

In the phase angle detector 7, the phase angle signal computed based on the [Formula 1] has specifically the wave form shown in the FIG. 5(g).

The differential analyzer 8 differentiates the phase angle signal inputted from the phase angle detector 7 by time and outputs the change of the angle as a signal expressed by a digital signal of at least 2 bits as shown in the FIG. 5(h).

In other words, in the FIG. 5(h), a signal expressing "−1", a signal expressing "+1", and a signal expressing "0" are outputted for start of gradual decrease in the strength of the phase angle signal, start of gradual increase in the strength of the phase angle signal, no change of the strength of the phase angle signal, respectively.

Hereafter, the signal outputted by the differential analyzer 8 is called "Eye-pattern".

For reference, plus and minus of a signal are commonly expressed using MSB (most significant bit) used for digital signal. For example, "−1", "+1", and "0" are expressed as "11", "01", and "00", respectively.

The integral electric discharge circuit 9 computes the integral value of Eye-pattern inputted from the differential analyzer 8 for every 1 symbol time based on the synchronized signal inputted from synchronizing circuit 11, that will be mentioned later, at each 1 symbol time, to output as an integral signal. The integral signal is reset to "0" for each 1 symbol, as shown in the FIG. 5(i) to become a function increasing and decreasing with approximately constant proportions.

The phase detection circuit 10 detects a point (change point) (the point A to point E in the FIG. 5), in which the change of a phase become discrete, on the basis of quantized signal I and quantized signal Q inputted from the first comparator 5a and the second comparator 5b, respectively, and output a signal showing detection of the change point of the phase to the synchronizing circuit 11.

The point (change point), in which the change of a phase become discrete, is the point in which progress of a phase reverses; for example, as seen by comparing a phase change in ranges A–B with B–C before and after the point B of FIGS. 5(c) and (d).

This means that in A–B range, the quantized signal I of the FIG. 5(c) more progresses and in B–C, the quantized signal Q of the FIG. 5(d) more progresses.

More specifically, the phase detection circuit 10 monitors the quantized signal I and the quantized signal Q; when in spite of no change of one signal, the other signal has changed twice, counts time from the first change to the second change to detect an instance of change point of the phase in the point at a time half the counted time.

The synchronizing circuit 11 outputs a synchronized signal as the change point of a symbol to the integral electric discharge circuit 9, when receives an inputted signal expressing detection of change point of the phase from the phase detection circuit 10.

This means that a synchronized signal can be yielded as 1 symbol time passed for each detection of the point, in which the phase of either the signal inputted from the first comparator 5a or the second comparator 5b or both of them becomes discrete, by the functions of the phase detection circuit 10 and the synchronizing circuit 11.

The four-value decision circuit 12 makes a decision on the basis of a value, which the integral signal inputted from the integral electric discharge circuit 9 reached in a symbol interval.

Specifically, the four-value decision circuit 12 outputs a signal (decision signal) expressing any one of the following four kinds of state to standardizing circuit 13: an integral signal inputted from the integral electric discharge circuit 9 is minus resembling the interval of A–B of the point of the FIG. 5, and is under the threshold value Y; plus resembling the interval of B–C of the point of the FIG. 5, over the threshold value X; plus resembling the interval of C–D of the point of the FIG. 5, and not over the threshold value X; minus resembling the interval of D–E of the point of the FIG. 5, and not under the threshold value Y.

The standardizing circuit 13 receives an input of decision signal, and outputs the signal, resulted from appropriate integral electric discharge previously set and corresponding to respective four kinds of state that is expressed by the decision signal, to the differential circuit 14.

This means that the standardizing circuit 13 is set to output an ideal integral value to be outputted by the integral electric discharge circuit 9, when the frequency of a signal received corresponds to the frequency of a signal of the local oscillation. This ideal integral value is named "theoretical integral signal".

The differential circuit 14 computes difference between the result of integration outputted the integral electric discharge circuit 9 and the ideal integral value outputted by the standardizing circuit 13 to output to the AFC circuit 15.

The AFC circuit 15 controls to change the frequency of the local oscillation by the VCO 1 according to a difference inputted from the differential circuit 14.

This means that the AFC circuit 15 tunes the VCO 1 to meet the local oscillation frequency oscillated by the VCO 1 to the frequency of a signal received and shifted by fading.

Subsequently, the action of a conventional orthogonal detection circuit is described.

The frequency of a signal received is received with a little shift caused by effect of fading etc.

On the other hand, the VCO 1 oscillates in a frequency before the shift has occurred and the phase shifter 2 shifts the phase of a signal outputted by the VCO 1 90°.

The first mixing circuit 3a, the first LPF 4a, the first comparator 5a, and the first moving average circuit 6a multiplies s signal inputted from the VCO 1 by a signal received, removes a high frequency, generates a quantized signal I, and generates a signal with a wave form, as shown in the FIG. 5(e), gradually changing.

The second mixing circuit 3b, the second LPF 4b, the second comparator 5b, and the second moving average circuit 6b multiplies a signal outputted by the VCO 1 and shifted 90° by the phase shifter 2, removes a high frequency, generates a quantized signal Q, and generates a signal with a wave form, as shown in the FIG. 5(f), gradually changing.

The phase angle detector 7 computes a phase angle made by respective signals inputted from the first moving average circuit 6a and the second moving average circuit 6b, and outputs to the differential analyzer 8 as a phase angle signal; and the differential analyzer 8 differentiates the phase angle signal by time and outputs a digital signal (Eye-pattern), that shows a direction of the signal of phase angle either in increase or in decrease, to the integral electric discharge circuit 9.

On the other hand, the functions of the phase detection circuit 10 and the synchronizing circuit 11 yields a synchronized signal for every 1 symbol time, the integral electric discharge circuit 9 integrates a eye-pattern that is inputted from the differential analyzer 8 and outputted to the four-value decision circuit 12 as an integrated value at every input of the synchronized signal.

The integrated value, as shown in the FIG. 5(i), expands radially from "0" corresponding to respective instances, for example, when the frequency of received signal corresponds to the frequency of the signal oscillated by the VCO 1.

Specifically, seemingly higher frequency received makes the integral value shift to a value increasing as shown in the point B to point C and point C–point D of the FIG. 5(i).

On the other hand, seemingly lower frequency received makes the integral value shift to a value decreasing as shown in the point A to point B and point D–point E of the FIG. 6(i).

And, the four-value decision circuit 12 outputs a decision signal to the standardizing circuit 13 according to the result of integration of the integral electric discharge circuit 9.

Besides, the standardizing circuit 13 outputs a value corresponding to the result of integration that is outputted by the integral electric discharge circuit 9, when the frequency of a received signal from the decision signal corresponds to the frequency of a signal oscillated by the VCO 1; the differential circuit 14 computes a difference between the value outputted by the standardizing circuit 13 and the result of integration actually outputted by the integral electric discharge circuit 9 to output to the AFC circuit 15.

Subsequently, the AFC circuit 15 controls the VCO 1 to make the difference between the result of the integration and the value (theoretical integral signal) outputted by the standardizing circuit 13 "0", on the basis of the signal arrived from the differential circuit 14.

Through these steps, the frequency of the signal outputted by the VCO 1 is soon controlled to correspond to the signal being received.

For reference, the orthogonal detection circuit in FSK receiver mentioned before is exemplified by the description of Japanese Published Unexamined Patent Application No. 1997-116578, "many-valued FSKL demodulator circuit".

This many-valued FSKL demodulator circuit can reduce the occurrences of jitter and unclarity of decision output of degree of a rotation rate and improve preciseness of demodulation, even in a small difference between the modulation indices of the FSK modulation; and orthogonally detects an inputted signal in zero IF detection circuit, smoothes a component of same phase and orthogonal component, that was subjected to two-value-shaping by the comparator, in the moving average circuit, discharges integrally the difference between phase angles and their delayed phase angles corresponding to the same phase component and the orthogonal component, that have been smoothed in the integral discharge circuit, and decides the level of integrally discharged output in the decision circuit.

For reference, a table ROM is used for the many-valued FSKL demodulator circuit to know the phase angle θ of the [Formula 1].

However, in the orthogonal detection circuit used in said conventional digital radio receiver, there is a problem that when a noise is mixed in a signal received, the AFC circuit cannot appropriately control a frequency, due to increased difference between the correct integral value outputted by the standardizing circuit and the incorrect integral value outputted by the integral discharge circuit, caused by a strong oscillation of the eye-pattern in the interval of the phase angle of which direction of rotation temporary reverses.

Besides, said conventional orthogonal detection circuit has generally a ROM (Read Only Memory) of the phase angle detection circuit computing [formula 1]. However, this case has a problem that a size of circuit cannot be satisfactory reduced even by using the ROM.

SUMMARY OF THE INVENTION

The present invention has a purpose to provide a method for frequency control and orthogonal detection circuit and FSK receiver capable of reduction of circuit size and appropriate control of frequency.

The present invention is a method for frequency control to integrate an axis-crossing signal showing that a signal point represented by phase I component being the same component and phase Q component being an orthogonal component, that have been made from a signal received and a signal outputted by the voltage control oscillator, crossed over any axis of I axis or Q axis being reference axes of IQ plane, for 1 symbol time, and detects the rotation of the signal point based on the result of integration, and controls the frequency of a signal outputted by the voltage control oscillator according to the rotation; detection of rotation, separately from the direction of rotation, allows reducing the circuit size temporary change of the direction of rotation of the signal point by a noise mixed in the signal received does not affect the rotation, and the frequency of the signal outputted by the voltage control oscillator can be appropriately controlled in a high preciseness.

The present invention is an orthogonal detection circuit, wherein concerning the signal point expressed by the I phase component and the Q phase component of a received signal and an oscillated signal, a detecting means for rotation direction detects the direction of rotation in the state of the signal point, the rotation rate detection means detects rotation rate by integrating an axis-crossing signal showing the crossing over the I axis or Q axis for a certain time, and the control means controls an oscillation frequency according to the rotation direction and rotation rate detected; and detection of rotation, separately from the direction of rotation, allows reducing the circuit size, temporary change of the direction of rotation of the signal point by a noise mixed in the signal received does not affect the rate of rotation, and the frequency of the signal outputted by the voltage control oscillator can be appropriately controlled in a high preciseness.

The present invention is an orthogonal detection circuit, wherein a decoder of rotation direction localizes the quadrant of the IQ plane having the signal point expressed by the I phase component and the Q phase component of a received signal and its delayed signal, and a frequency of an oscillated signal and outputs a difference between the value of the quadrant in the received signal and the value of the quadrant in the delayed signal, the synchronization means outputs a synchronized signal for every 1 symbol time, the first integral electric discharge circuit integrates and outputs the difference of values of quadrants that are inputted from the decoder of rotation direction for 1 symbol time according to the synchronized signal, a means for detection of crossing over the I axis detects that the signal, point crossed the I axis in the IQ plane and outputs a signal of detection of crossing over the I axis, a means for detection of crossing over the Q axis detects that the signal point crossed the Q axis in the IQ plane and outputs a signal of detection of crossing over the Q axis, the adder adds the signal of detection of crossing over the I axis and the signal of detection of crossing over the Q axis to output an axis crossing signal, the second integral electric discharge circuit integrates the axis crossing signal for 1 symbol time according to the synchronized signal to output a integral signal, the reversing circuit reverses the code of the integrated result in the second integral electric discharge circuit to output, the selector circuit selects and outputs the output of the second integral electric discharge circuit, when the input from the first integral electric discharge circuit is plus, and selects and outputs the output of the reversing circuit, when the input from the second integral electric discharge circuit is minus, and the frequency control means controls an oscillation frequency according to a signal inputted from the selector circuit; detection of rotation, separately from the direction of rotation, allows reducing the circuit size temporary change of the direction of rotation of the signal point by a noise mixed in the signal received does not affect the rotation, and the frequency of the signal outputted by the voltage control oscillator can be appropriately controlled in a high preciseness.

The present invention is a FSK receiver having said orthogonal detection circuit and capable of reduction of a circuit size and appropriate frequency control.

DESCRIPTION OF REFERENCE NUMERALS

Figure 1:
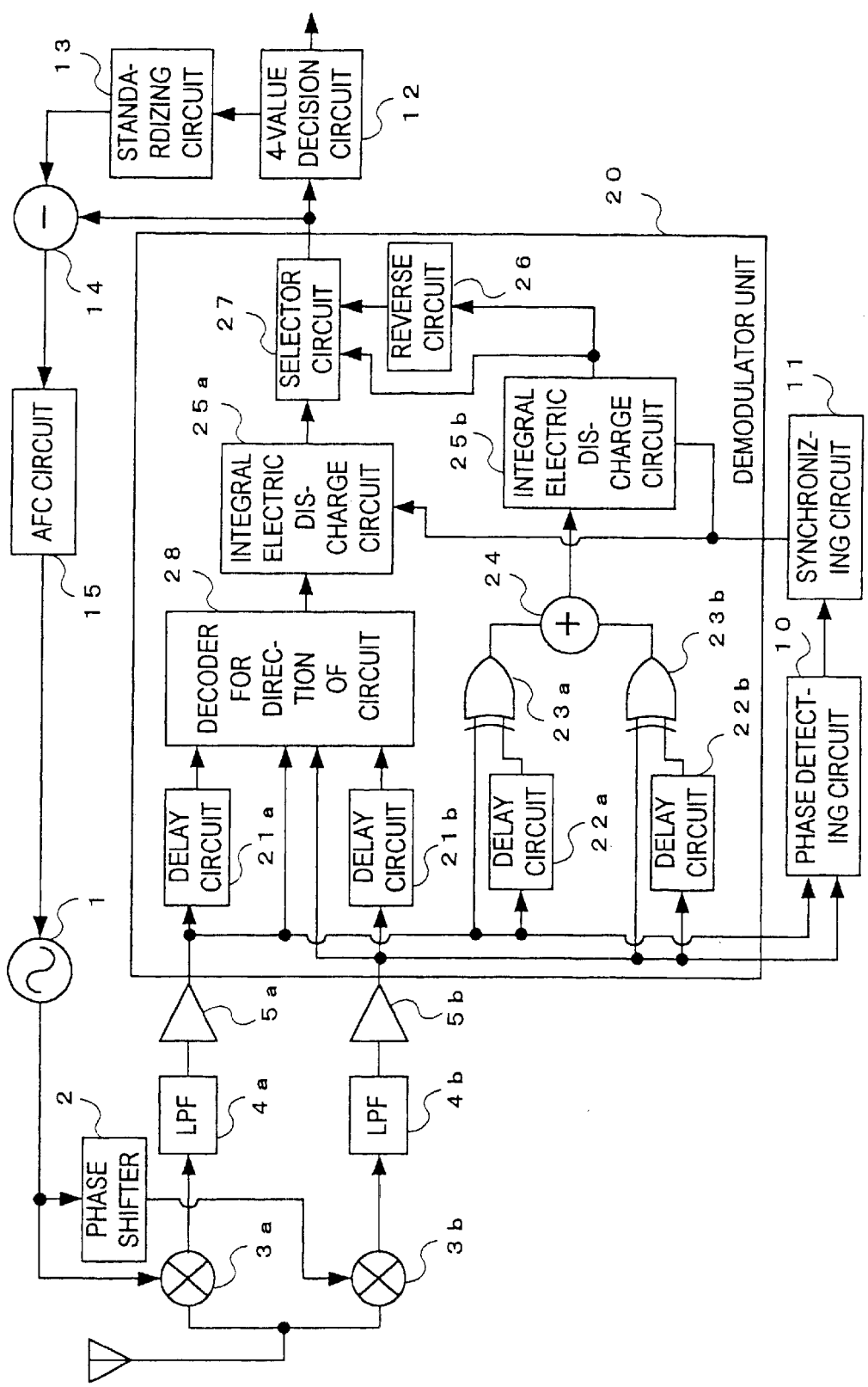
FIG. 1 is a block diagram of the orthogonal detection circuit of the mode of carrying out the present invention.

1, VCO; 2, phase shifter; 3, mixing circuit; 4, LPF; 5, comparator; 6, moving average circuit; 7, detector of phase shift angle; 8, differential analyzer; 9, integral electric discharge circuit; 10, phase detection circuit; 11, synchronizing circuit; 12, decision circuit; 13, standardizing circuit; 14, differential circuit; 15, AFC circuit; 20, demodulator unit; 21, 22, delay circuit; 23, XOR circuit; 24, adder; 25, integral electric discharge circuit; 26, reversing circuit; 27, selector circuit; 28, decoder for rotating direction.

DESCRIPTION OF THE PREFERRED EMBODIMENT

Mode for carrying out the invention is given below by way of illustration.

The following means for practice can be any circuit or apparatus that can realize the function, and a part or all of functions can be realized by computer software. Further, a means for practice of functions may be realized by a plurality of circuits and a plurality of means for practice of functions may be realized by a single circuit.

The frequency control method and the orthogonal detection method of the mode for carrying out the invention detect the direction of rotation and the rate of rotation of a signal point expressed by I phase component and Q phase component of received signal and oscillating frequency by separate means, and control the frequency of a signal outputted by a VCO according to the direction of rotation and the rate of rotation detected by respective means, particularly, the detection means of rotation rate detects a rotation rate (rotation per 1 symbol time) as the result of integration by integrating a signal showing frequency of crossing over I axis and Q axis of a signal point for 1 symbol time to allow appropriate action of the AFC with a high preciseness reducing a circuit size.

Said frequency control method and the orthogonal detection circuit can be used for a FSK receiver.

The orthogonal detection circuit of the mode for carrying out the invention is constituted by a detection means of the direction of rotation to detect the direction of rotation, a detection means of the rate of rotation to detect the rate of rotation, for the direction of rotation and the rate of rotation of a signal point expressed by I phase component and Q phase component of received signal and oscillating frequency, and a control means to control an oscillating frequency according to these direction of rotation and rate of rotation detected.

The detection means of the direction of rotation inputs I phase component and Q phase component of received signal and oscillating frequency, and delayed I phase component and delayed Q phase component generated by delay of them, detects the direction of rotation in the IQ plane.

The detection means of the rate of rotation detects the rate of rotation according to the crossing frequency of the I axis and Q axis of the signal point on the basis of I phase component and delayed I phase component and Q phase component and delayed Q phase component of received signal and oscillating frequency.

The control means selects the rate of rotation detected by the detection means of the rate of rotation in the direction of rotation detected by the detection means of the direction of rotation, and controls the oscillating frequency according to the direction of rotation detected and the rate of rotation selected.

The control means, as mentioned later, has a selection means to select the rate of rotation according to the direction of rotation detected, a synchronizing means to yield synchronization, and a frequency control means to control oscillating frequency based on the direction of rotation detected and the rate of rotation selected.

The orthogonal detection circuit (the main circuit) of the mode of carrying out the present invention is, as shown in the FIG. 1, constituted by a VCO (voltage control oscillator) 1 outputting an oscillating frequency, a phase shifter 2 shifting a phase of a signal 90°, the first mixing circuit 3a and the second mixing circuit 3b multiplying two signals, the first LPF (low path filter) 4a and the second LPF 4b removing a high frequency component, the first comparator 5a and the second comparator 5b outputting a digital signal over or not over a certain threshold value, a demodulator 20 that is a characterized part of the present invention, a phase detection circuit 10 detecting a changing point of a phase in an input signal, a synchronizing circuit 11 outputting a synchronized signal for an inputted signal showing the detected changing point of a phase, a decision circuit 12 deciding the state of an integral signal, a standardizing circuit 13 outputting an appropriate integrated result based on the decision signal, a differential circuit 14 computing a difference between the output of the demodulator 20 and the output of the standardizing circuit 13, and an AFC circuit (automatic frequency control) circuit 15 controlling local oscillation frequency of the VCO 1. FIG. 1 is a block diagram of the orthogonal detection circuit of the mode of carrying out the present invention.

The demodulator unit 20 of the orthogonal detection circuit of the mode of carrying out the present invention has the detection means of the direction of rotation detecting the direction of rotation of the signal point expressed by I phase component and Q phase component of a signal received, and the detection means of the rate of rotation detecting the rate of rotation of the signal point.

The detection means of the direction of rotation on the demodulator unit 20 has a delay means delaying the I phase component of a signal received (quantized I signal), a delay means delaying the Q phase component of a signal received (quantized Q signal); and decision means of direction of rotation deciding the direction of rotation of the signal point in the IQ plane on the basis of quantized I signal, delayed quantized I signal, quantized Q signal, delayed quantized Q signal.

The detection means of the rate of rotation in the demodulator unit 20 has a delay means delaying the I phase component of a signal received (quantized I signal), a delay means delaying the Q phase component of a signal received (quantized Q signal), and a means outputting the rate of rotation to output the rate of rotation of the signal point in the IQ plane on the basis of quantized I signal, delayed quantized I signal, quantized Q signal, delayed quantized Q signal.

Particularly, the means outputting the rate of rotation has a detection means of crossing over I axis detects crossing over the I axis on the basis of the quantized signal I and the delayed quantized signal Q, a detection means of crossing over Q axis detects crossing over the Q axis on the basis of the quantized signal Q and the delayed quantized signal Q, an adding means adding a signal of crossing over the I axis to a signal of crossing over the Q axis to output a signal (axis crossing signal) expressing crossing over either I axis or Q axis, an integration means to integrate the axis crossing signal for 1 symbol time, and a reverse means to reverse and output the result of integration.

In the demodulator unit 20, the selection means constituting a part of the control means selects a signal outputted from any one of the integration means or the reverse means in the means outputting the rate of rotation, according to the direction of rotation outputted by the means outputting the rate of rotation and outputs the direction of rotation and the rate of rotation.

More specifically, the demodulator unit 20 of the orthogonal detection circuit of the mode of carrying out the present invention is constituted by the first delay circuit 21a, second delay circuit 21b, third delay circuit 22a, and fourth delay circuit 22b as a delay means delaying an input signal for a given certain time to output, the first XOR circuit 23a and the second XOR circuit 23b, as the a means to detect crossing over the I axis or a means to detect crossing over the Q axis, to compute exclusive OR of an input signal, an adder 24 as an adding means to add an input signal, the first integral discharge circuit 25a and the second integral discharge circuit 25b as an integrating circuit to integrate an input signal, a reversing circuit 26 as a reversing means to reverse a code of the value of an inputted signal, a selector circuit 27 as a means for selection of an inputted signal, a decoder for rotating direction 28, as a decision means of rotating direction, to output a signal showing the rotating direction of a signal point.

Figure 2:
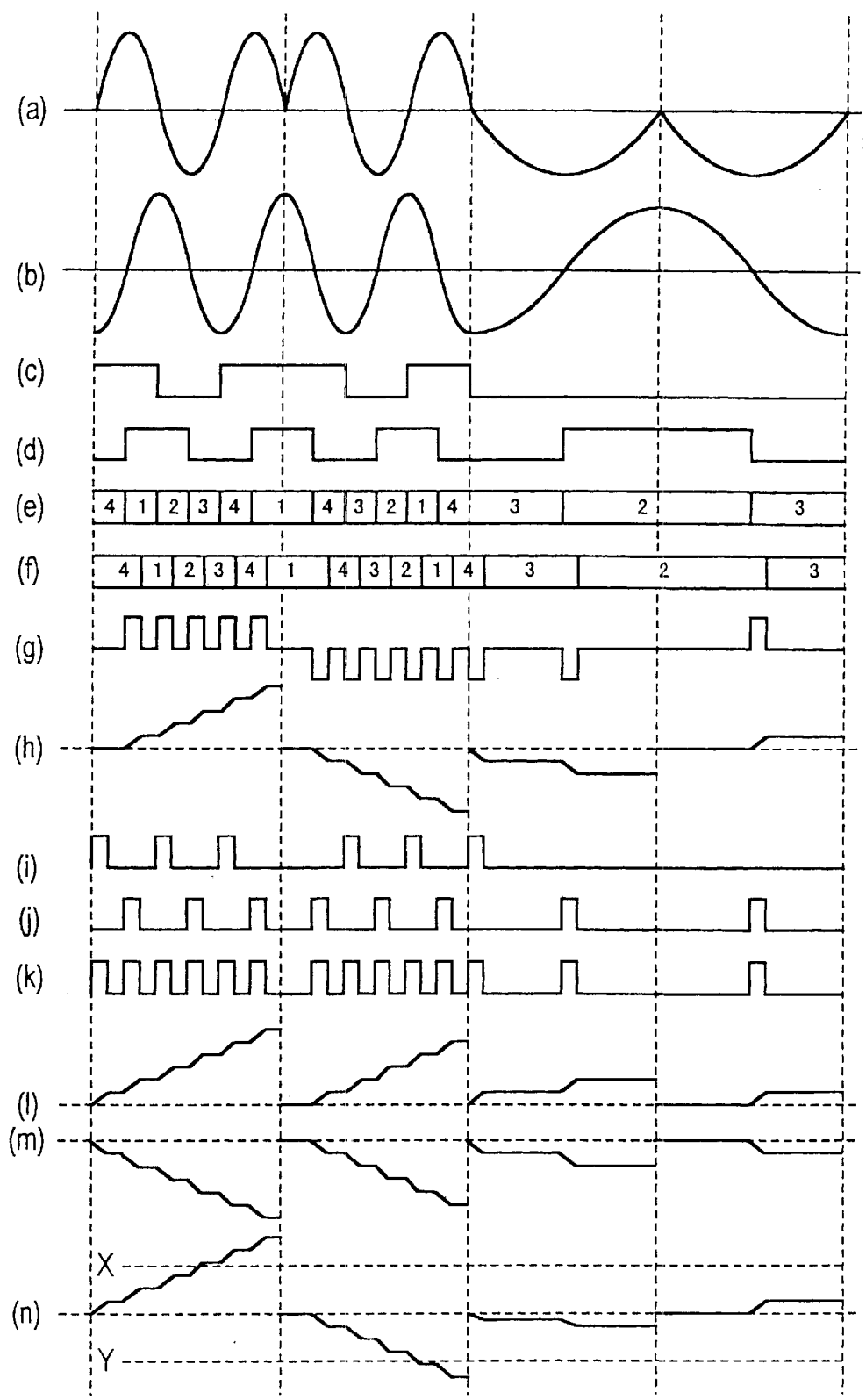
FIG. 2 is a figure of a timing chart showing actions of respective parts of the orthogonal detection circuit of the mode of carrying out the present invention.

Respective units of the present circuit are specifically described with reference to FIG. 1 and FIG. 2, as follows. A VCO 1, a phase shifter 2, the first mixing circuit 3a, the second mixing circuit 3b, the first LPF 4a, the second LPF 4b, the first comparator 5a, the second comparator 5b, a phase detection circuit 10, a synchronizing circuit 11, a decision circuit 12, a standardizing circuit 13, a differential circuit 14, and an AFC circuit 15 have same performance as those conventional. The FIG. 2 is a figure of a timing chart showing actions of respective units of the orthogonal detection circuit of the mode of carrying out the present invention.

The demodulator unit 20 receives inputs of a quantized signal I (FIG. 2(c)) and a quantized signal Q (FIG. 2(d)) from the first comparator 5a and the second comparator 5b, respectively, to detect the rotation direction and rotation rate and outputs to outside.

The signal point is that made by plotting values of the quantized signal I and the quantized signal Q on the IQ plane.

Figure 3:
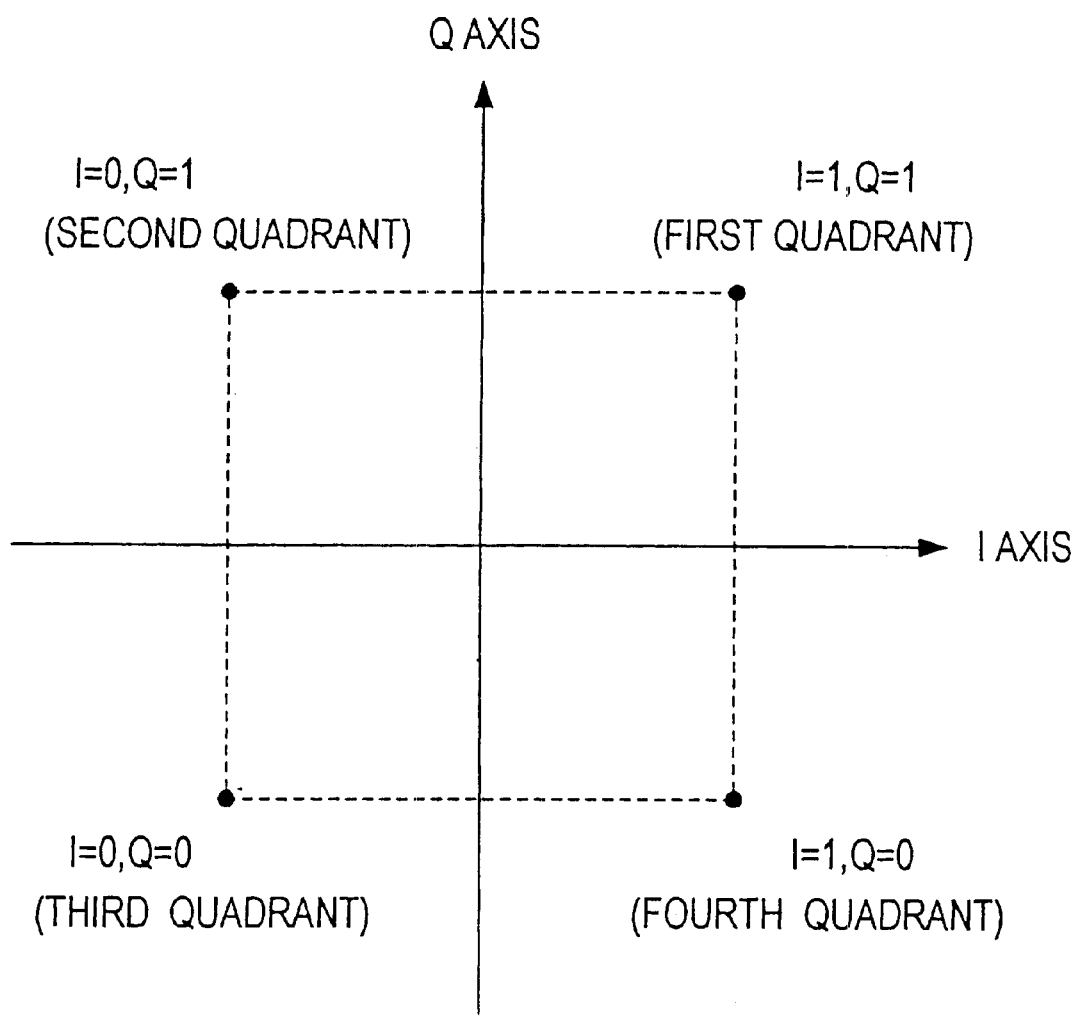
FIG. 3 is an illustrative figure showing a concept of a signal point.
Figure 4:
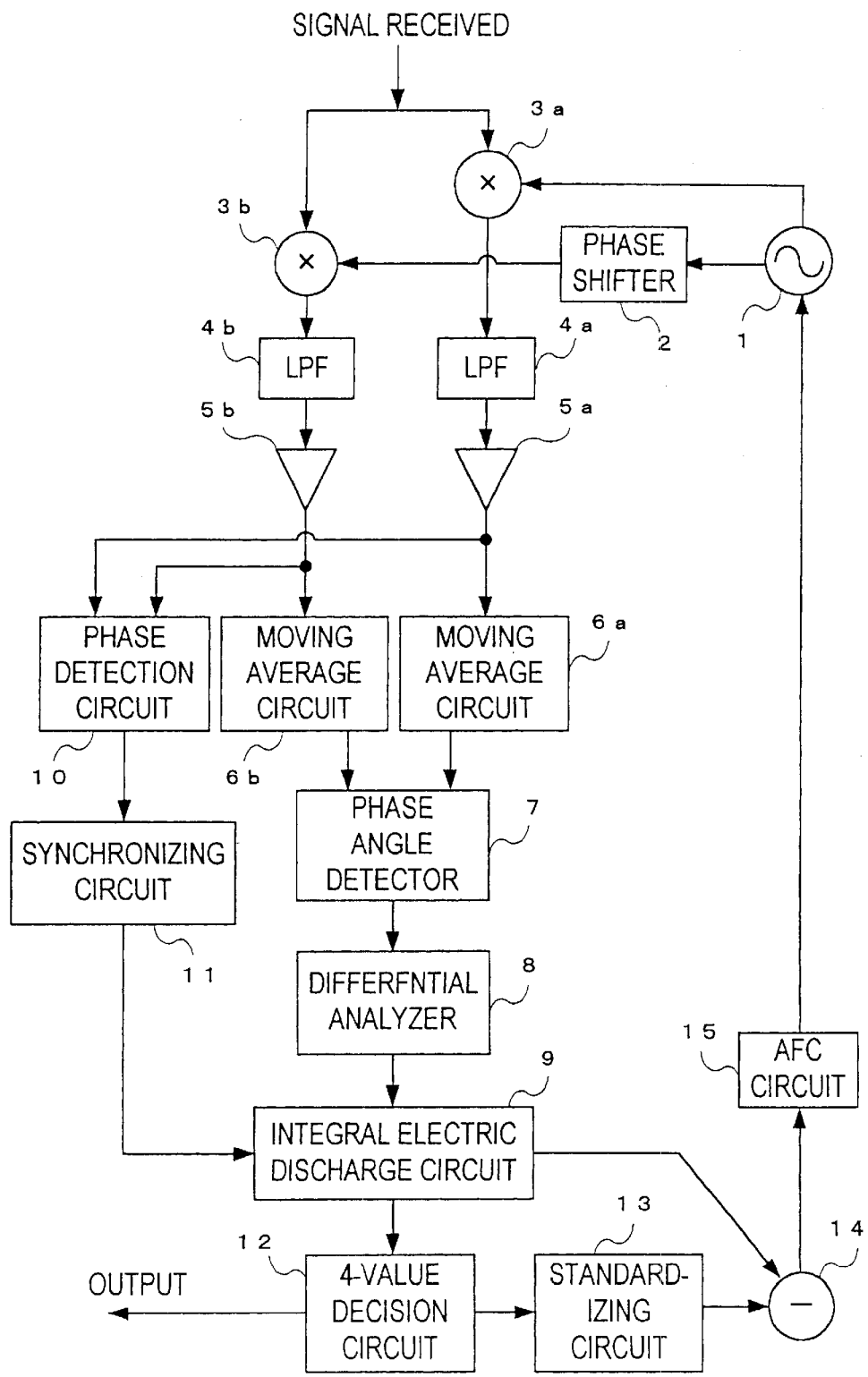
FIG. 4 is a block diagram of a conventional orthogonal detection circuit.
Figure 5:
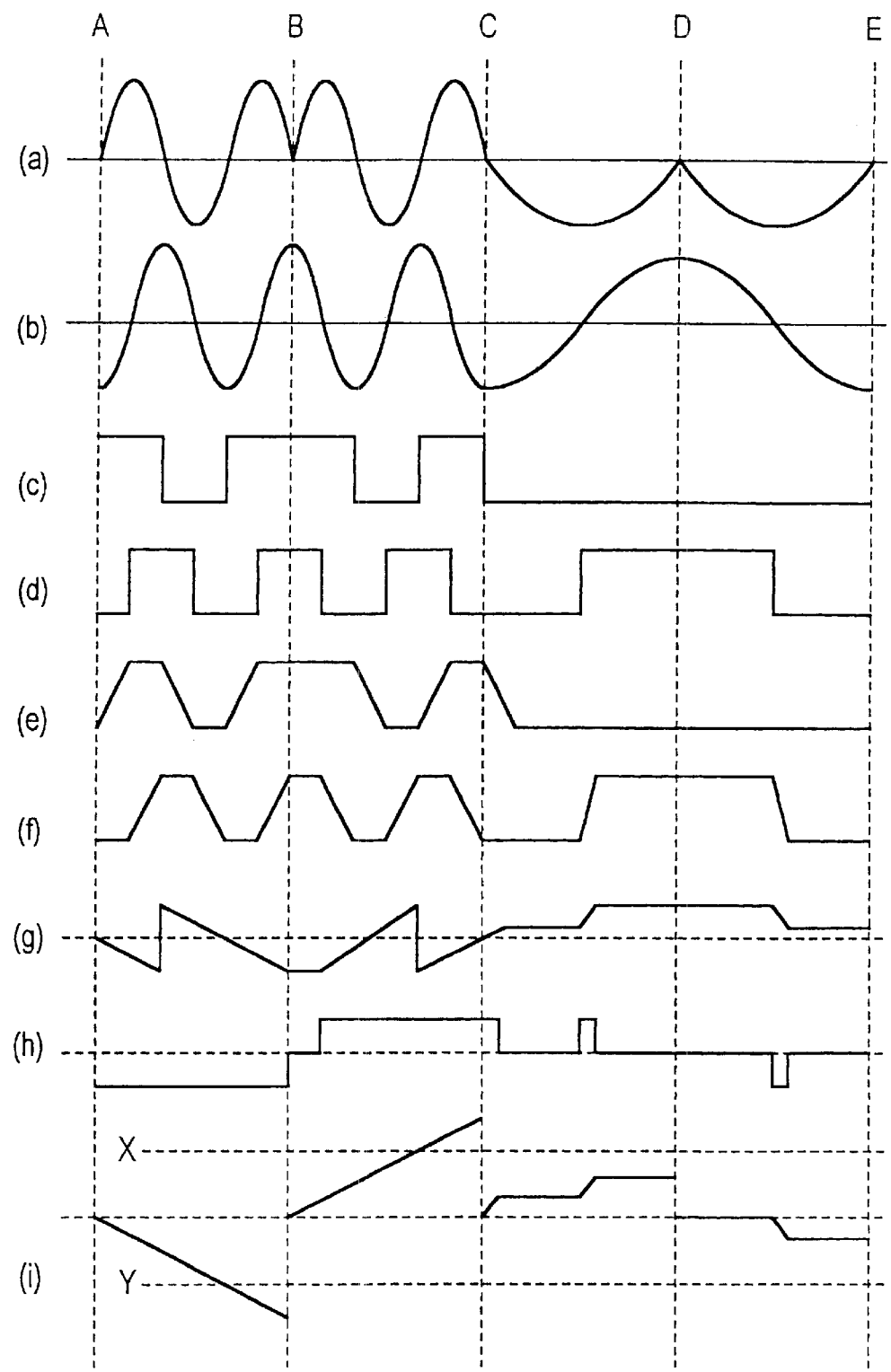
FIG. 5 is a figure of a timing chart showing actions of the conventional orthogonal detection circuit.

The signal point is expressed by 4 points showed in the FIG. 3, because the quantized signal I and the quantized signal Q make a digital signal of 1 bit for simple description. FIG. 3 is an illustrative figure diagram showing a concept of a signal point.

For convenience, when the quantized signal I and the quantized signal Q are "1" and "1", the signal point is in the first quadrant of the IQ plane; when "0" and "1", in the second quadrant, "0" and "0", in the third quadrant, and "1" and "0", in the fourth quadrant.

Specifically, the first delaying circuit 21a, the second delaying circuit 21b, the decoder for rotating direction 28, and the first integral electric discharge circuit 25a, of the demodulator unit 20, act as a means (means for detect direction of rotation) to detect direction of rotation of the signal point.

The third delaying circuit 22a, the fourth delaying circuit 22b, the first XOR circuit 23a, the second XOR circuit 23a, an adder 24, the second integral electric discharge circuit 25b, and the reversing circuit 26 acts as a means (a means for detection of rotation rate) to detect rotation (hereafter, simply "rotation rate") of the signal point per 1 symbol time.

The respective first delaying circuit 21a and second delaying circuit 21b delay the quantized signal I inputted from the first comparator 5a and the quantized signal Q inputted from the second comparator 5b for a certain time ($\tau 1$) previously set and output.

Hereafter, the quantized signal I and the quantized signal Q that have been delayed are named "delayed quantized I signal" and "delayed quantized Q signal" respectively.

The decoder for rotating direction 28 receives an output of the quantized signal I and the quantized signal Q from the first comparator 5a and the second comparator 5b, respectively, and receives delayed I signal" and "delayed Q signal from the first delaying circuit 21a and the second delaying circuit 21b respectively, and outputs the direction of rotation and the rate of rotation of the signal point as the pulsed signal shown in FIG. 2(g).

The decoder for rotating direction 28 as decision means of the direction of rotation constituting a part of the detection means of the direction of rotation is simply expected to detect the direction of rotation, however, naturally yields the rate of rotation.

Specifically, the decoder for rotating direction 28 outputs a plus pulse signal when the signal point rotates anti-clockwise on the IQ plane, and a minus pulse signal when the signal point rotates clockwise on the IQ plane.

On the other hand, the decoder for rotating direction 28 also expresses the rate of rotation according to the number of pulses outputted for 1 symbol time.

This means that about 5 pulses outputted for 1 symbol time in the left-hand half of the FIG. 2(g) and expresses a relatively high rate of rotation.

About one pulse outputted for 1 symbol time in the right-hand half of the FIG. 2(g) expresses a relatively low rotation.

The decoder for rotating direction 28 will be described in detail later.

The first integral discharge circuit 25a integrates a pulse signal inputted from the decoder for rotating direction 28 for 1 symbol interval according to the synchronized signal inputted from the synchronizing circuit 11 and outputs the result of integration to selector circuit 27.

The third delay circuit 22a, as same as the first delay circuit 21a, delays the quantized signal I inputted from the first comparator 5a for a time, $\tau 2$, to output.

The fourth delay circuit 22b, as same as the second delay circuit 21b, delays the quantized signal Q inputted from the second comparator 5b for a time, $\tau 2$, to output.

The delay time, $\tau 2$, may or may not be same as the delay time, $\tau 1$. The FIG. 2, a case in which $\tau 1$ and $\tau 2$ are same is presented for simplification.

The first XOR circuit (exclusive OR circuit) 23a inputs a quantized signal I from the first comparator 5a and a delayed signal I from the third delay circuit 22a, computes an exclusive OR, and outputs to the adder 24.

The second XOR circuit 23b inputs a quantized signal Q from the second comparator 5b and a delayed signal Q from the fourth delay circuit 22b, computes an exclusive OR, and outputs to the adder 24.

It is assumed that if the result of computation of the exclusive OR is logically "true", the first and second XOR circuits 23 output "1", and if logically false", output "0".

The result of computation of the exclusive OR outputted from the first XOR circuit 23a is a signal displays "1", only when the code of a signal (the quantized signal I) inputted from the first comparator 5a differs from the code of a signal (delayed I signal) inputted from the third delaying circuit 22a. Therefore, the exclusive OR outputted from the first XOR circuit 23a has been become a signal meaning that a signal point crossed over the I axis. The signal meaning that a signal point crossed over the I axis is named "Signal crossed over the I axis".

The exclusive OR outputted from the second XOR circuit 23b is a signal displays "1", only when the code of the quantized signal Q differs from that of the delayed Q signal, and has been become a signal meaning that a signal point crossed over the Q axis. The signal meaning that a signal point crossed over the Q axis is named "Signal crossed over Q axis".

For reference, in WHAT IS CLAIMED IS, "means of detection of crossing over I axis" represents third delay circuit 22a and the first xor circuit 23a and "means of detection of crossing over q axis" represents the fourth delay circuit 22b and the second xor circuit 23b The adder 24 adds a signal (signal crossing over I axis) inputted from the first XOR circuit 23a to a signal (signal crossing over Q axis) inputted from the second XOR circuit 23b to output to the second integral discharge circuit 25b.

This means that the signal outputted by the adder 24 is a signal (hereafter, axis-crossing signal) expressing that a signal point crossed either I axis or Q axis.

The second integral discharge circuit 25b integrates a signal (axis crossing signal) inputted from the adder 24 for 1 symbol time according to a signal (synchronized signal) inputted from the synchronizing circuit 11 to output to the reversing circuit 26 and the selector circuit 27 as an integral value.

The reversing circuit 26 reverses the code of the integral value inputted from the second integral discharge circuit 25b to output to the selector circuit 27.

The selector circuit 27 receives an input of the integral values from the respective first integral discharge circuit 25a, second integral discharge circuit, and reversing circuit 26, and outputs the integrated value inputted from the second integral discharge circuit 25b as an integral signal as it is, if integrated value inputted from the first integral discharge circuit 25a is plus.

On the other hand, the selector circuit 27 outputs the integrated value inputted from the reversing circuit 26 as an integral signal as it is, if integrated value inputted from the first integral discharge circuit 25a is minus.

Finally, the wave form of the output signal of the selector circuit 27, for example, becomes that as shown in the FIG. 2(n).

For reference, in WHAT IS CLAIMED IS, "reversing means" represents the reversing circuit 26 and "selecting means" represents the selector circuit 27.

On the other hand, in WHAT IS CLAIMED IS, "synchronization means" represents phase detection circuit 10 and synchronizing circuit 11 and "frequency control means" represents the four-value decision circuit 12, standardizing circuit 13, differential circuit 14, and AFC circuit 15.

In addition, "control means" represents said selection means, synchronization means, and frequency control means.

Herewith, the decoder for rotating direction 28 is described below in detail.

The decoder for rotating direction 28 decides the quadrant in the IQ plane in which a signal point located on the basis of combination of the quantized I signal and the quantized Q signal inputted from the first comparator 5a and the second comparator 5b, and generates a signal (a quadrant signal) representing the quadrant.

For example, if a signal inputted from the first comparator 5a is "1" and a signal inputted from the second comparator 5b is "1", the decoder for rotating direction 28 decides that the signal point is located in the first quadrant, and generates a quadrant signal showing the location in the first quadrant.

Actually, the decoder for rotating direction 28 generates the quadrant signal shown in the FIG. 2(c) corresponding to the input of the quantized signal I and the quantized signal Q shown in the FIG. 2(c) and FIG. 2(d).

On the other hand, the decoder for rotating direction 28 generates another quadrant signal (named "delayed quadrant signal") corresponding to the input of the delayed signal I and the delayed signal Q from the first delay circuit 21a and second delay circuit 21b.

This means that this quadrant signal delays for a time of $\tau 1$ than the quadrant signal generated according to the quantized signal I and the quantized signal Q. specifically, becomes the signal shown in the FIG. 2(f).

And, the decoder for rotating direction 28 subtracts delayed quadrant signal shown in the FIG. 2(f) from the quadrant signal shown in FIG. 2(e), and outputs to the integral discharge circuit 25a as a pulse signal shown in the FIG. 2(g). As a rule, if [quadrant of FIG. 2(e)]−[quadrant of FIG. 2(f)]>0, outputs a "plus" pulse, and if [quadrant of FIG. 2(e)]−[quadrant of FIG. 2(f)]<0, outputs a "minus" pulse; as an exception, if [the first quadrant]−[the fourth quadrant], outputs a "plus" pulse and [the fourth quadrant]−[the first quadrant], outputs a "minus" pulse. Namely, when the direction of rotation is anti-clockwise, "plus" pulse is outputted, and when the direction of rotation is clockwise, "minus" pulse is outputted.

When a delayed quadrant signal representing the fourth quadrant is subtracted from a quadrant signal representing the first quadrant, a "plus" pulse is outputted, if the direction of rotation is anti-clockwise; this is in consideration of movement from the fourth quadrant to the first quadrant.

By the same reasoning, when a quadrant signal represents the fourth quadrant and a delayed quadrant signal represents the first quadrant, "minus" pulse is outputted.

Below is the description of the action of the present circuit.

The frequency of a signal received is received with shift caused by effect of fading etc.

On the other hand, the VCO 1 outputs a signal oscillating with a frequency before shift and the phase shifter 2 shifts the phase of the signal outputted by the VCO 1 90°.

The first mixing circuit 3a multiplies a signal outputted from the VCO 1 by a signal received, the first LPF 4a removes a high frequency of the signal inputted from the first mixing circuit 3a, the first comparator 5a generates a quantized signal I, that is a digital signal of 1 bit, based on the signal to output a signal shown in the FIG. 2(c).

The second mixing circuit 3b multiplies a signal outputted from the VCO 1 by a signal received, the second LPF 4b removes a high frequency component from the signal inputted from the second mixing circuit 3b, and the second comparator 5b generates a quantized signal Q, that is a digital signal of 1 bit, based on the signal and outputs a signal shown in the FIG. 2(d).

The decoder for rotating direction 28 generates a quadrant signal expressing a quadrant on the IQ plane as shown in the FIG. 2(e) on the basis of a signal inputted from the first comparator 5a and the second comparator 5b, receives the inputs of the delayed signal I and the delayed signal Q from the first delay circuit 21a and second delay circuit 21b, and generates a delayed quadrant signal expressing a quadrant on the IQ plane based on the delayed signal I and the delayed signal Q as shown in the FIG. 2(f).

The decoder for rotating direction 28 subtracts a delayed quadrant signal from the quadrant signal and generates to output a pulse signal of plus and minus as shown in the FIG. 2(g).

On the other hand, the function of phase detection circuit 10 and synchronizing circuit 11 yields a synchronized signal for every 1 symbol time, and the first integral discharge circuit 25a integrates the pulse signal outputted from the decoder for rotating direction 28 according to the synchronized signal for 1 symbol time, yields a integral value to output to selector circuit 27.

On the other hand, the third delay circuit 22a delays a signal inputted from the first comparator 5a for a time, τ2, and the fourth delay circuit 22b delays a signal inputted from the second comparator 5b for a time, τ2, respectively to output.

Subsequently, the first XOR circuit 23a computes an exclusive OR between a signal inputted from the third delay circuit 22a and a signal inputted from the first comparator 5a to output as signal crossed over I axis.

Besides, the second XOR circuit 23b computes an exclusive OR between a signal inputted from the fourth delay circuit 22b and a signal inputted from the second comparator 5b to output as "signal crossed over Q axis".

The adder 24 adds the signal crossed over I axis and signal crossed over Q axis inputted from the first XOR circuit 23a and the second XOR circuit 23b to output a signal crossed over the axis. Where, the signal crossing over the axis outputted from the adder 24 becomes a signal, for example, shown in the FIG. 2(k).

And, the second integral discharge circuit 25b integrates the signal crossed over the axis and inputted from the adder 24 for 1 symbol time according to the synchronized signal to make an integral value to the result of the integration, and outputs respectively the reversing circuit 26 and a selector circuit 27. The integral value outputted from the second integral discharge circuit 25b is, specifically, the signal shown in the FIG. 2(l).

The reversing circuit 26 reverses the code of the integral value inputted from the second integral discharge circuit 25b and outputs to the selector circuit 27 as a signal shown in the FIG. 2(m).

The selector circuit 27 selects the integral value inputted from the second integral discharge circuit 25b and outputs as integral signal as it is, when the code of the integral value inputted from the first integral discharge circuit 25a is "plus", and selects an integral value, of which code has been reversed, inputted from the reversing circuit 26 to output as an integral signal, when the code of the integral value inputted from the first integral discharge circuit 25a is "minus".

The 4-value decision circuit 12 outputs a decision signal according to the integral value inputted from the selector circuit 27 as same as conventional method, and the standardizing circuit 13 receives the input of the decision signal and outputs a signal as the result of appropriate integral electric discharge previously set according to respective 4 kinds of state expressed by the decision signal.

This means that when the frequency of a signal received corresponds to a local oscillation frequency, the standardizing circuit 13 has been set to allow the second integral discharge circuit 25b to output an ideal integral value that the circuit 25b is expected to output. This ideal integral value is named "theoretical integral signal".

The differential circuit 14 computes a difference between the value outputted from the standardizing circuit 13 and the result of integration actually outputted by the selector circuit 27 and outputs to the AFC circuit 15.

The AFC circuit 15 adjusts the VCO 1 to make the value outputted by the differential circuit 14 "0", and soon the frequency of the signal outputted by the VCO 1 corresponds to the frequency of the signal received.

According to the orthogonal detection circuit of the mode of carrying out the present invention, when a noise, that reverse temporarily the direction of rotation, is mixed, the integral value of the second integral discharge circuit 25b is not affected, because frequency (number of signals crossed over the axis) crossed over the I axis or Q axis on the IQ plane is integrated. This means that the integral value outputted by the selector circuit 27 is not affected by a noise, and the following effect occurs that the AFC circuit 15 can appropriately control the frequency of a local oscillation signal outputted from the VCO 1 in a high preciseness.

In addition, in the orthogonal detection circuit of the mode of carrying out the present invention, no computation of the [formula 1] is required, different from the orthogonal detection circuit. Therefore, ROM for computation is not required; in replacement, the number of signals crossed over the axis is detected by using the delay circuit 22, XOR circuit 23, adder 24, and by this, the rate of rotation of a signal point is detected to cause an effect to make circuit size small.

According to the present invention, a frequency control method by integrating a signal of axis crossing expressing that the signal point crossed over the axis of any one of axis I and axis Q that are reference axes of the IQ plane, for 1 symbol time, detecting rotation of the signal point by the result of integration, and controlling the frequency of the signal outputted by the voltage controlled oscillator according to the rotation; therefore, a simple circuit can detect the rotation, aside from the direction of rotation, of the signal point by detecting the rotation of the signal point according to frequency of the code change of either the I phase component or the Q phase component of a received signal, the direction of rotation of the signal point temporarily changed by mixing of a noise in the signal received does not affect the rotation, and finally, an effect occurs to provide possible control of the frequency of the signal outputted by the voltage controlled oscillator in a high preciseness.

The orthogonal detection circuit of the present invention, wherein the means for the detection of the direction of rotation detects the direction of rotation in the state of signal point for the signal point expressed by I phase component and Q phase component of a signal received and an frequency of oscillation, the means for the detection of the rate of rotation detects the rate of rotation by integrating a signal crossing over the axis showing crossing over the I axis or Q axis for a certain time, the control means controls the oscillation frequency according to the direction of rotation and the rate of rotation detected; therefore, detection of the rate of rotation, aside from the direction of rotation, allows small size of circuit and the direction of rotation of the signal point temporarily changed by mixing of a noise in the signal received does not affect the rate of rotation, and an effect occurs to provide possible control of the frequency of the signal outputted by the voltage controlled oscillator in a high preciseness.

An orthogonal detection circuit of the present invention, wherein a decoder for rotating direction decides a quadrant in the IQ plane in which the signal point is expressed by the I phase component and the Q phase component of a received signal and its delayed signal, and an oscillated signal and outputs a difference between the value of a quadrant in a received signal and the value of a quadrant in a delayed signal, the synchronized means outputs a synchronized signal for 1 symbol time, the first integral electric discharge circuit integrates the difference of the quadrant value inputted from the decoder for rotating direction for 1 symbol time according to the synchronized signal to output, the means to detect crossing over the I axis detects crossing of the signal point over the I axis on the IQ plane to output the detected signal of crossing over the I axis, the means to detect crossing over the Q axis detects crossing of the signal point over the Q axis on the IQ plane to output the detected signal of crossing over the Q axis, an adder adds the detected signal of crossing over the I axis to the detected signal of crossing over the Q axis to output a signal of crossing over the axis, the second integral discharge circuit integrates a signal of crossing over the axis for 1 symbol time according to the synchronized signal to output a integral signal, the reversing circuit reverses the code of the value of the result of integration in the second integral discharge circuit to output, the selector circuit selects and outputs the output of the second integral discharge circuit, when an input from the first integral discharge circuit is plus, and selects and outputs an output from the reversing circuit, when the input from the first integral discharge circuit is minus the frequency control means controls an oscillation frequency according to the signal inputted from the selector circuit; detection of the rotation, aside from the direction of rotation, allows small size of circuit and the direction of rotation of the signal point temporarily changed by mixing of a noise in the signal received does not affect the rotation, and an effect occurs to provide possible control of the frequency of the signal outputted by the voltage controlled oscillator in a high preciseness.

An FSK receiver of the present invention, having said orthogonal detection circuit, wherein rotation is detected, aside from the direction of rotation, on the basis of the frequency of change of the code of either I phase component or Q phase component of a received signal and oscillation frequency to allow reducing the size of a circuit, the direction of rotation of the signal point temporarily changed by mixing of a noise in the signal received does not affect the rotation, and finally, an effect occurs to provide possible appropriate control of the frequency of the signal outputted by the voltage controlled oscillator in a high preciseness.

What is claimed is:

1. An orthogonal detection circuit comprising:
    a decoder of rotation direction localizes a quadrant of a IQ plane having a signal point expressed by I phase component being same component and Q phase component being an orthogonal component of a received signal and a delayed signal of the received signal, and a signal outputted by a voltage controlling oscillator and outputs a difference between the value of the quadrant in the received signal and the value of the quadrant in the delayed signal,
    a portion of synchronizing outputs a synchronized signal for every 1 symbol time,
    a first integral electric discharge circuit integrates and outputs the difference of values of quadrants that are inputted from the decoder of rotation direction for 1 symbol time according to the synchronized signal,
    a portion of detection of crossing over I axis detects that the signal point crossed the I axis in the IQ plane and outputs a signal of detection of crossing over the I axis,
    a portion of detection of crossing over Q axis detects that the signal point crossed the Q axis in the IQ plane and outputs a signal of detection of crossing over the Q axis,
    an adder adding the signal of detection of crossing over the I axis inputted from the portion of detection of crossing over the I axis to the signal of detection of crossing over the Q axis inputted from the portion of detection of crossing over the Q axis to output an axis crossing signal,
    a second integral electric discharge circuit integrating the axis crossing signal inputted from the adder for 1 symbol time according to the synchronized signal to output an integral signal,
    a reversing circuit reversing the code of the integrated result in the second integral electric discharge circuit to output,
    a selector circuit selecting and outputting the output of the second integral electric discharge circuit, when an input from the first integral electric discharge circuit is plus, and selecting and outputting the output of the reversing circuit, when the input from the first integral electric discharge circuit is minus, and
    a frequency control portion controlling a frequency of the signal outputted by a voltage control oscillator according to a signal inputted from the selector circuit.

2. The orthogonal detection circuit according to claim 1, wherein
    a portion of detection of crossing over I axis having a delay circuit to receive an input of a quantized signal I made by expressing the code of an I phase component, that is a component of same phase as those of a signal received and a signal outputted by a voltage control oscillator, with a digital signal to output the quantized signal I by delaying for a certain time, and
    an exclusive OR circuit to compute an exclusive OR between the quantized signal I and a quantized signal I delayed by the delay circuit, to detect the change of the code of the quantized signal I expressing crossing over the I axis.

3. The orthogonal detection circuit according to claim 1, wherein
    a portion of detection of crossing over Q axis having
        a delay circuit to receive an input of a quantized signal Q made by expressing the code of a Q phase component, that is an orthogonal component of a signal received and a signal outputted by a voltage control oscillator, with a digital signal to output the quantized signal Q by delaying for a certain time, and
        an exclusive OR circuit to compute an exclusive OR between the quantized signal Q and a quantized signal Q delayed by the delay circuit, to detect the change of the code of the quantized signal Q expressing crossing over the Q axis.

4. The orthogonal detection circuit according to claim 1, wherein
   a portion of synchronizing having
      a phase detection circuit to monitor respective changes of phases of an I phase component, that is a component of same phase as those of a signal received and a signal outputted by a voltage control oscillator and a Q phase component, that is an orthogonal component of a signal received and a signal outputted by the voltage control oscillator and to detect a point of change in which any one of phases become discrete, and
      a synchronizing circuit to output a synchronized signal, when the point of change is detected.

5. The orthogonal detection circuit according to claim 1, wherein
   a frequency control portion having
      a 4-value decision circuit to decide a symbol on the basis of an integral value inputted from the selector circuit and to output the decided value,
      a standardizing circuit to output a theoretical integral signal that becomes an ideal integral signal previously set according to a decided value inputted from the 4-value decision circuit,
      a differential circuit to compute a difference between the integral signal inputted from the selector circuit and the theoretical integral signal inputted from the standardizing circuit, and
      an automatic frequency control circuit to control a frequency of a signal outputted by the voltage control oscillator to make a difference inputted from the differential circuit zero.

6. An FSK receiver having an orthogonal detection circuit comprising:
   a decoder of rotation direction localizes a quadrant of a IQ plane having a signal point expressed by I phase component being same component and Q phase component being an orthogonal component of a received signal and a delayed signal of the received signal, and a signal outputted by a voltage controlling oscillator and outputs a difference between the value of the quadrant in the received signal and the value of the quadrant in the delayed signal,
   a portion of synchronizing outputs a synchronized signal for every 1 symbol time,
   a first integral electric discharge circuit integrates and outputs the difference of values of quadrants that are inputted from the decoder of rotation direction for 1 symbol time according to the synchronized signal,
   a portion of detection of crossing over I axis detects that the signal point crossed the I axis in the IQ plane and outputs a signal of detection of crossing over the I axis,
   a portion of detection of crossing over Q axis detects that the signal point crossed the Q axis in the IQ plane and outputs a signal of detection of crossing over the Q axis,
   an adder adding the signal of detection of crossing over the I axis inputted from the portion of detection of crossing over the I axis to the signal of detection of crossing over the Q axis inputted from the portion of detection of crossing over the Q axis to output an axis crossing signal,
   a second integral electric discharge circuit integrating the axis crossing signal inputted from the adder for 1 symbol time according to the synchronized signal to output an integral signal,
   a reversing circuit reversing the code of the integrated result in the second integral electric discharge circuit to output,
   a selector circuit selecting and outputting the output of the second integral electric discharge circuit, when an input from the first integral electric discharge circuit is plus, and selecting and outputting the output of the reversing circuit, when the input from the first integral electric discharge circuit is minus, and
   a frequency control portion controlling a frequency of the signal outputted by a voltage control oscillator according to a signal inputted from the selector circuit.

7. The FSK receiver according to claim 6, wherein
   portion of detection of crossing over I axis having a delay circuit to receive an input of a quantized signal I made by expressing the code of an I phase component, that is a component of same phase as those of a signal received and a signal outputted by a voltage control oscillator, with a digital signal to output the quantized signal I by delaying for a certain time, and
   an exclusive OR circuit to compute an exclusive OR between the quantized signal I and a quantized signal I delayed by the delay circuit, to detect the change of the code of the quantized signal I expressing crossing over the I axis.

8. The FSK receiver according to claim 6, wherein
   a portion of detection of crossing over Q axis having
      a delay circuit to receive an input of a quantized signal Q made by expressing the code of a Q phase component, that is an orthogonal component of a signal received and a signal outputted by a voltage control oscillator, with a digital signal to output the quantized signal Q by delaying for a certain time, and
      an exclusive OR circuit to compute an exclusive OR between the quantized signal Q and a quantized signal Q delayed by the delay circuit, to detect the change of the code of the quantized signal Q expressing crossing over the Q axis.

9. The FSK receiver according to claim 6, wherein
   a portion of synchronizing having
      a phase detection circuit to monitor respective changes of phases of an I phase component, that is a component of same phase as those of a signal received and a signal outputted by a voltage control oscillator and a Q phase component, that is an orthogonal component of a signal received and a signal outputted by the voltage control oscillator and to detect a point of change in which any one of phases become discrete, and
   a synchronizing circuit to output a synchronized signal, when the point of change is detected.

10. The ESK receiver according to claim 6, wherein
   a frequency control portion having
      a 4-value decision circuit to decide a symbol on the basis of an integral value inputted from the selector circuit and to output the decided value,
      a standardizing circuit to output a theoretical integral signal that becomes an ideal integral signal previously set according to a decided value inputted from the 4-value decision circuit,
      a differential circuit to compute a difference between the integral signal inputted from the selector circuit and the theoretical integral signal inputted from the standardizing circuit, and
      an automatic frequency control circuit to control a frequency of a signal outputted by the voltage control oscillator to make a difference inputted from the differential circuit zero.

* * * * *